United States Patent [19]
Bardet et al.

[11] Patent Number: 5,260,936
[45] Date of Patent: Nov. 9, 1993

[54] HDLC STORE AND FORWARD APPARATUS

[75] Inventors: Gerard Bardet, Cagnes sur Mer; Jean-Francois Le Pennec, Nice; Patrick Michel, La Gaude; Philippe Therias, Nice, all of France

[73] Assignee: International Business Machines Corp., Armonk, N.Y.

[21] Appl. No.: 904,084

[22] Filed: Jun. 25, 1992

[30] Foreign Application Priority Data

Nov. 29, 1991 [EP] European Pat. Off. ........ 91480175.8

[51] Int. Cl.$^5$ .................... H03M 13/00; H04L 1/00
[52] U.S. Cl. ........................................ 370/61; 371/53
[58] Field of Search ............... 370/60, 60.1, 61, 94.1, 370/94.2, 94.3; 371/51.1, 53, 71, 67.1, 37.1

[56] References Cited

U.S. PATENT DOCUMENTS

| | | | |
|---|---|---|---|
| 4,723,244 | 2/1988 | Iacoponi | 371/37.1 |
| 4,964,127 | 10/1990 | Calvignac et al. | 371/37.1 |
| 5,046,069 | 9/1991 | Calvignac et al. | 371/53 |
| 5,121,396 | 6/1992 | Irvin et al. | 371/53 |

FOREIGN PATENT DOCUMENTS 0313707 5/1989 European Pat. Off. .
0366589 5/1990 European Pat. Off. .

Primary Examiner—Douglas W. Olms
Assistant Examiner—Hassan Kizou
Attorney, Agent, or Firm—Edward H. Duffield

[57] ABSTRACT

A store and forward apparatus includes a deserializer for deserializing received frames of data into a sequence of n-bit words. Each frame includes a header, a data field and a frame checking sequence (FCS) generated by a first telecommunication node. The apparatus includes a storage for storing the deserialized n-bit words, and a processor for addressing the storage and for generating n-bit words corresponding to a new header of the received frame. The apparatus also includes a serializer receiving the n-bit words from the storage for generating a new frame having a new header field and a new FCS to be transmitted to a second telecommunication node. The apparatus further includes a receiver for receiving a frame and computes a first partial FCS covering the frame's data field only and a storage for storing the first partial FCS. During forwarding, n-bit words to be transmitted are simultaneously received by the serializer and by an apparatus for computing a second partial FCS covering the data field only. At the end of the serialization process, the two partial FCS results are compared to detect an error occurring during the computing of the new header of the frame. The result of the comparison is used as a control signal for altering the value of the FCS computed by serializer prior to transmission.

9 Claims, 11 Drawing Sheets

STORING PROCESS

FORWARD PROCESS

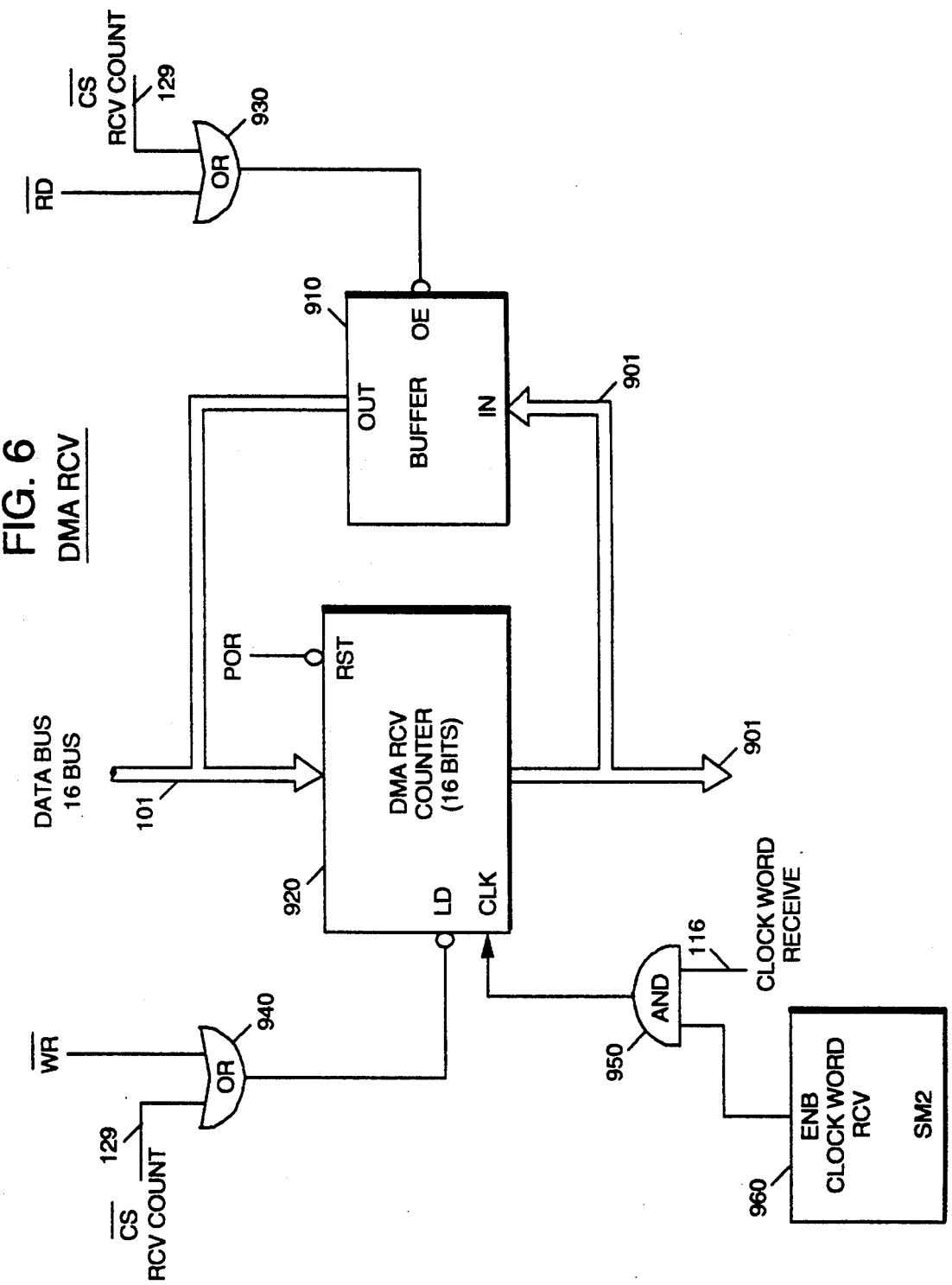

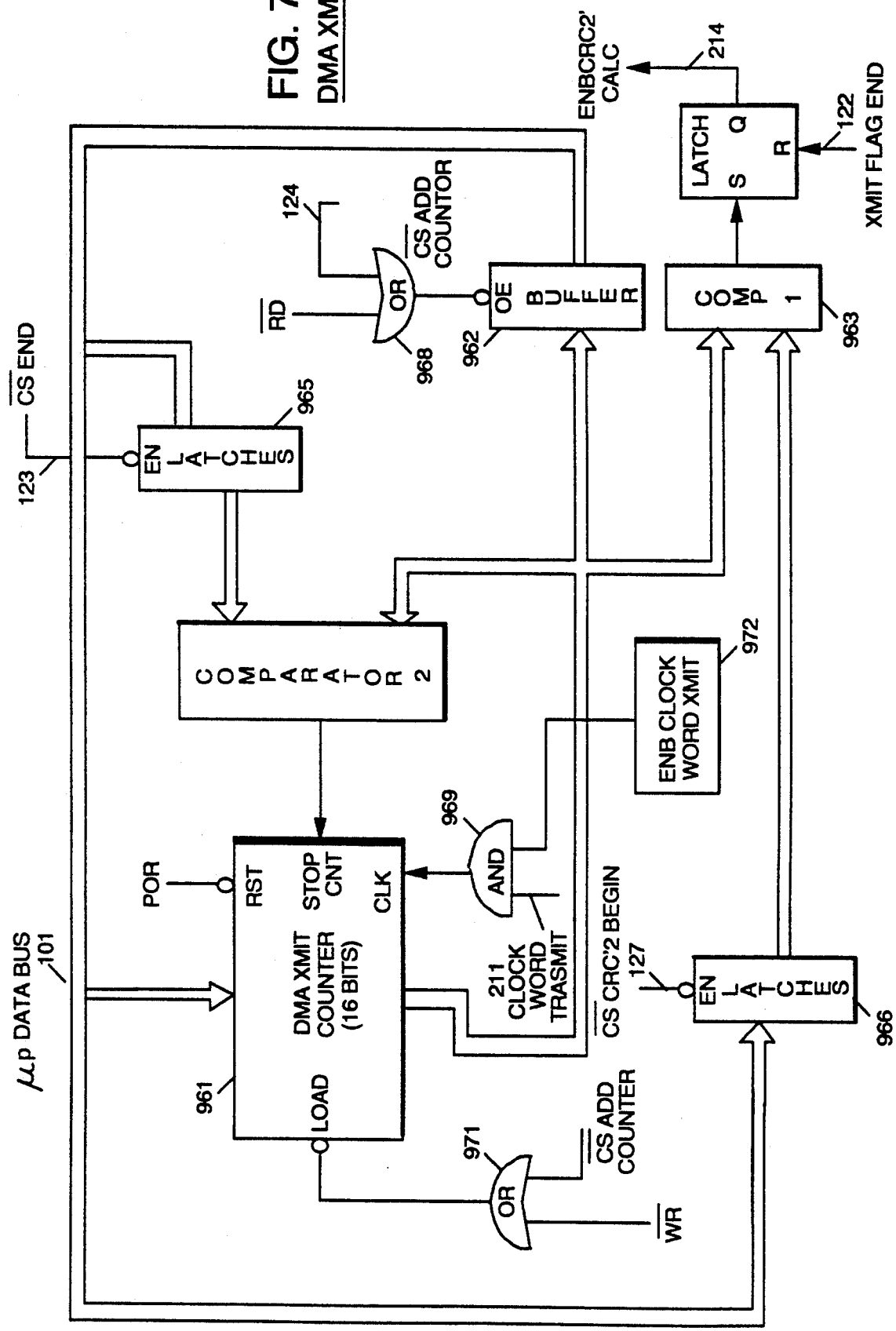

DMA RECEIVE STATE MACHINE 1 (SM1)

$\overline{\text{STATE 2}}$ DMA RECEIVE STATE MACHINE 1

STATE 2 DMA RECEIVE STATE MACHINE 1

$\overline{\text{HLDA}}$ (126)

HLDA (126)

HLD = STATE 1
$\overline{\text{CSRx}}$ = STATE 2+3+4+5
$\overline{\text{WR RAM}}$ = STATE 3 + 4

DMA RECEIVE STATE MACHINE 2 (SM2)

ENABLE CLOCK WORD RECEIVE (962) = STATE 2 + STATE 3

DMA XMIT STATE MACHINE (SM3)

DMA XMIT STOCKE MACHINE (SM4)

ENABLE CLOCK WORD TRANSMIT (972) = STATE 2 + STATE 3

5,260,936

HDLC STORE AND FORWARD APPARATUS

TECHNICAL FIELD

The invention relates to store and forward mechanisms for telecommunication equipment and particularly to an apparatus including means for deserializing an HDLC frame. The frame includes data which is received from a first telecommunication node under the form of a sequence of n-bit words, including a header, a data field and a frame checking sequence (FCS) generated by the first node. The apparatus includes a storage for storing the deserialized n-bit words using Direct Memory Access means, and processing means for computing a new header for replacement of the header of the received HDLC frame in storage. The store and forward apparatus comprises serializing means which fetches the n-bit words in the storage the DMA means and which forwards them under the form of a new HDLC frame including a new FCS, to a second telecommunication node.

BACKGROUND ART

Stare and forward mechanisms, particularly in X25 and frame relay applications, are widely known in the telecommunication field. They allow the transfer of packets of data through the different nodes of the network. The integrity of data transmitted throughout the network is a key problem to telecommunication developers. Two main sources of errors actually may affect the communication.

First, erroneous data might be introduced in the frame as it is transmitted from one node to another. Such errors are effectively detected by using well known Frame Checking Sequences (FCS) or CRC checksums involved in the High Data Link Control (HDLC) procedures. In such mechanisms, the transmitting station sends a packet and appends to it an appropriate computed CRC checksum. At the other end of the line, the receiving node stores the transmitted checksum, calculates its own CRC checksum, and compares the two checksumsto detect the occurrence of a possible error during the transmission of the packet through the line.

However, although errors can alter the data during its transmission through the line, frames can unfortunately be affected during their processing inside a telecommunication node, for example, during storage in the RAM storage of the machine. Indeed, after the above comparison of the transmitted checksum and the computed checksum, the received frame including a header field and a data field is stored into the storage of the machine before any further processing. Then, a processor also included in the machine separates the header field and processes it according to the address to which the packet is to be delivered and then generates another header. Then, a further new CRC checksum is computed which corresponds to both the new header and the data field and a new frame comprising the new header, the data field and the new checksum is transmitted to the next telecommunication node. During the above processing of the frame, errors might unfortunately be introduced within the memory since RAM storages are sensitive to electrostatic discharges, alpha particles, glitches, and other noise sources. Errors might also be introduced during the storage of data in memory at the BUS level, i.e. DMA error. It appears that those errors are introduced within the frame after the checking of the received CRC checksum which was computed by the preceeding telecommunication node, and before the computation of the next CRC checksum which will be appended to the packet when it is transmitted to the further telecommunication node. Consequently, errors which have occurred during the processing of the frame can not be detected by the traditional store and forward mechanisms.

Since store and forward mechanisms process a large number of packets, it is highly desirable to assure the integrity of data during its storage within the PAM of the machine without requiring further processing resources from the processor which are already affected to provided the required communication rate, and also without requiring supplementary data storage. Further, as it appears from the document Data Communication, Sep. 21, 1991, page 70, "one of the most significant sources of TCP/IP overhead is the delay associated with calculating the checksums used to verify the integrity of data. Before the transmitting station can send a packet, it must calculate the packet's checksum and append that checksum to the packet's header". It is therefore highly desirable to provide the data integrity during the transfer in RAM without requiring further processing resources which would first overload the processor and secondly involves a supplementary delay, thus requiring a larger storage capacity.

BRIEF SUMMARY OF THE INVENTION

The technical problem to be solved consists in the conception of a store and forward mechanism for a telecommunication machine running with a HDLC protocol, by which it is possible to assure the integrity of data during its transfer within the storage of the machine without requiring any processing resources from the processor therein included or creating further delay.

This problem is solved by the store and forward apparatus according to the present invention which includes means receiving in parallel the received HDLC frame simultaneously to the deserializing means and which computes a first partial FCS over the data field, and means for storing that partial FCS. During the forward phase, the n-bits words which are to be transmitted to the next telecommunication node are simultaneously received by the HDLC serializer and by means for computing a second partial FCS covering said data field only of said forwarded HDLC frame. At the end of the serialization process of the data field of the HDLC frame, the two partial results are compared in order to detect the occurrence of an error which might have appeared in the storage during the computing of the new header of the frame. The result of that comparison is used as a control signal for altering the value of the FCS computed by the RDLC computed before it is transmitted to the telecommunication line. Since the computing of both the first and second partial FCS is, respectively, performed during the deserializing of the RDLC frame and the serializing of the processed n-bit data words, no extra delay is required. The integrity of data during its storage in RAM is therefore provided without requiring additional processing resources since the processor which is included within the store and forward mechanism has its resources which remain fully allocated for the store and forward process.

In a preferred embodiment of the invention, the store and forward mechanism includes a FIFO storage which has an output bus which is separate from the data bus which addresses the RAM. In this way, the comparison of the first and second partial results does not require the access of the data bus.

Preferably, the deserializing means is an HDLC receiver which deserializes HDLC frames into n-bit words and which generates a control signal for setting a latching circuit when the first bit of the data field of the incoming frame is received, and a second control signal for resetting said latching circuit when the last bit of the data field of said HDLC frame has been received. The said means for computing said first partial FCS is a FCS generator which receives the serial frame at its input and which has a clock input controlled by the output of said latching circuit. This allows the used of widely known FCS generators, and the partial FCS result is computed only by controlling the signal entered at its clock input.

In a preferred embodiment, the serializing means is an HDLC transmitter which has a control input for causing an alteration of the next bit which will appear at its output, and the control input receives the result of the comparison of the first and second partial result.

BRIEF DESCRIPTION OF THE DRAWINGS

FIG. 6 is an illustration of the Direct Memory Access (DMA) receive part of DMA control circuit 900.

FIG. 7 is an illustration of the DMA transmit part of the DMA control circuit 900.

DETAILED DESCRIPTION OF THE PREFERRED EMBODIMENT OF THE INVENTION

Figure 1:
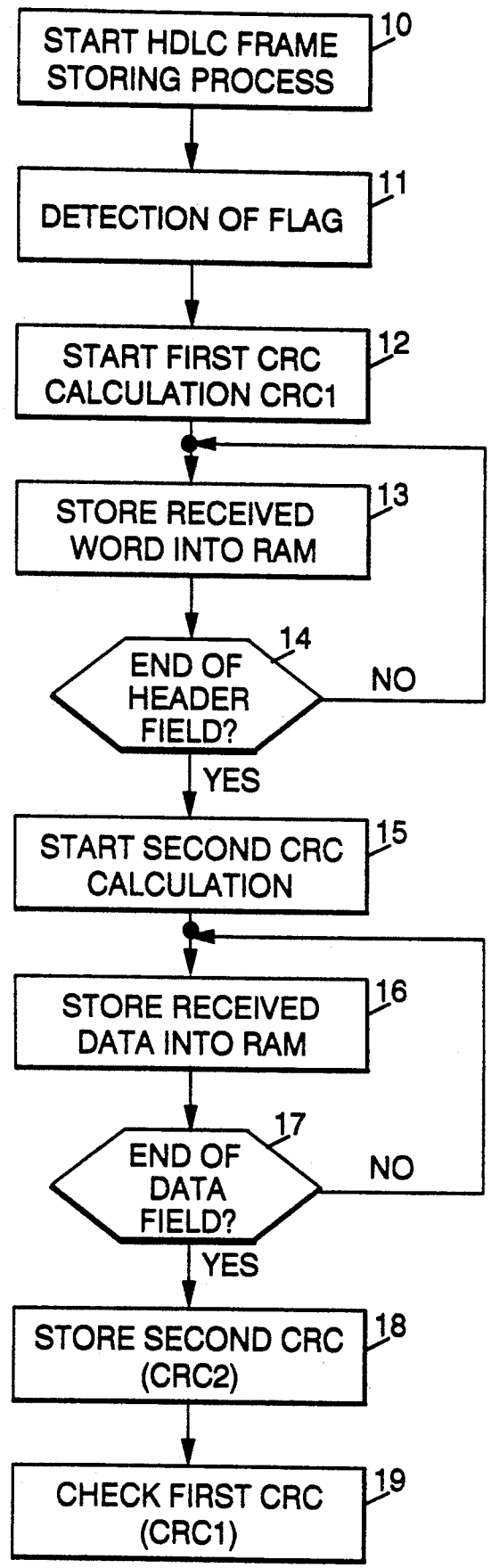
FIG. 1 is a basic flow chart detailing the principle of the storing process of the store and forward mechanism according to the present invention.

FIG. 1 shows the principle of the storing process according to the present invention. After the initialization procedures, the apparatus is ready to receive HDLC or SDLC frames, step 10. The processing of one received frame begins on the detection of the traditional HDLC or SDLC flag, step 11. Step 12, the deserializer which is included into the receive part of the telecommunication node starts computing the Frame Checking Sequence (FCS) or CRC checksum on the first bit of the header field. In parallel to that CRC computation, the received bits are sequentially grouped into n-bit words and are successively stored in the RAM as they appear at the output of the HDLC receiver until the last bit of the header field occurs, which is detected by means of a test on the last bit of the header field, step 14. On the occurrence of the last bit of the header field, the process goes to step 15 where a second CRC computing is initiated by a separate CRC generator in parallel with the above first CRC computation. The deserialization process of the incoming frame then continues and the received bits are grouped and stored in the storage, step 16, until the occurrence of the last bit of the data field of the HDLC frame. That last bit is detected by means of a test which is performed in step 17. In step 18, the result of the second CRC calculation is stored into a FIFO storage as the result of the first CRC calculation is used, as traditionally, to check the integrity of the HDLC frame received from the line.

Figure 2:
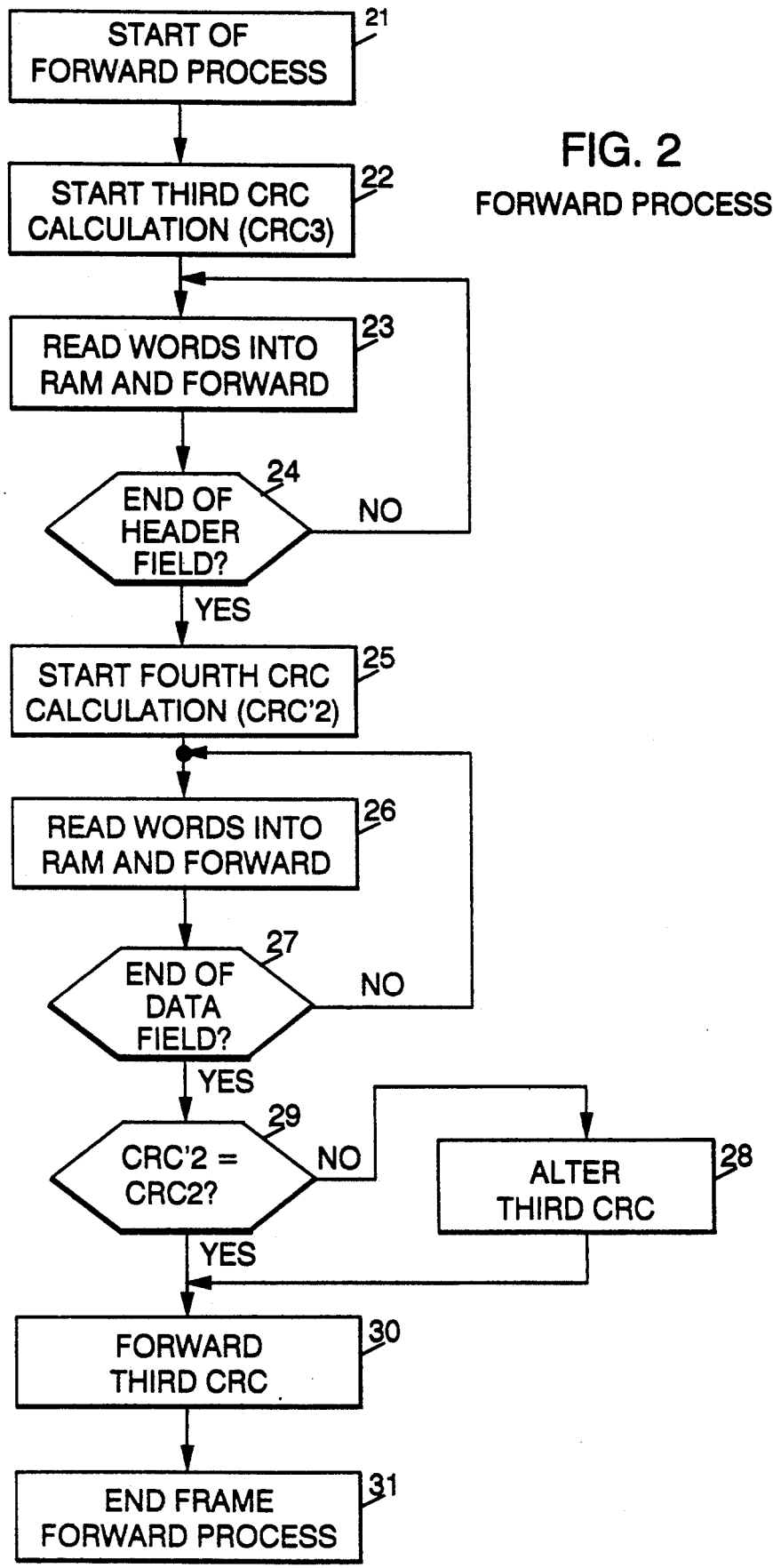
FIG. 2 is a basic flow chart detailing the principle of the forward process involved in the store and forward mechanism according to the present invention.

With respect to FIG. 2, the forward process can start when the new header has been computed, step 21. Then, in step 22, the first n-bit word corresponding to the first bits of the header are provided to the serializer which immediately starts the computation of a CRC, hereinafter referred to as the third CRC computation, which will be transmitted to the next telecommunication node. The n-bit data words are successively read from the storage while the HDLC transmitters generates the corresponding series of data bits which are forwarded to the network. This is achieved by means of a read/forward operation performed in step 23 in order to extract the groups of bits from the storage and to send them to the HDLC transmitter, associated with a test in step 24 in order to detect the end of the header field of the HDLC frame to be transmitted. As long as the last bit of the header field has not been extracted from storage, the process proceeds to step 23 where a new group of bits is read f rom the memory and provided at the input of the serializer. On the contrary, when the latter serializer receives the last group of bits of the header field, a fourth CRC computation process is started, step 25, in a second separate CRC generator having its input bus connected to the input of the HDLC transmitter. As above, that second CRC computation is processed parallely to the CRC computation which is performed in the HDLC serializer and which started with the first bit of the header field of the HDLC frame to be transmitted. The serialization process of the HDLC frame then continues with the serialization of the data field of the frame.

This is achieved as follows. In step 26, the following group of bits of the data field is extracted from the storage and provided to the HDLC serializer and also to the above second separate CRC generator. In step 27, a test is performed to determine whether the current group of data which is serialized is the last group of the data field of the HDLC frame, in which case the process proceeds to step 29. In the reverse case, the process goes back to step 26 where the next group of data bits is extracted from the storage and serialized by the HDLC serializer. When the last bit of the data field has been provided to the latter, and serialized thereinto, the fourth CRC computation process completes and its result is compared with the result of the second CRC computation which was stored in the FIFO.

If an error has been introduced in the RAM storage while processing of the header field of the frame, both results will be different and the latter comparison will fail. Then, in step 28, the apparatus will generate an alteration control signal which will indicate to the HDLC serializer, which has also completed its own CRC checksum calculation but not yet transmitted on the line, to alter the latter result. The latter is then forward by the telecommunication line to the next telecommunication node in step 30. That next node will easily detect the error introduced during the storage of the bits in the RAM by means of the traditional FCS or CRC checksum computation which is traditionally performed in the receive part of that next node. When the whole HDLC frame has been transmitted to the line, the frame forward process completes, in step 31. Since the second and fourth CRC computation process are performed on the serial train of bits, parallely to the deserialization and serialization process, no further processing delay is required in the whole processing of the received HDLC frame. Particularly, the resources of the processor, which is included in the telecommunication node providing the store and forward mechanism in accordance to the present invention, still performs the traditional processing of the header of the HDLC frame.

Figure 3:
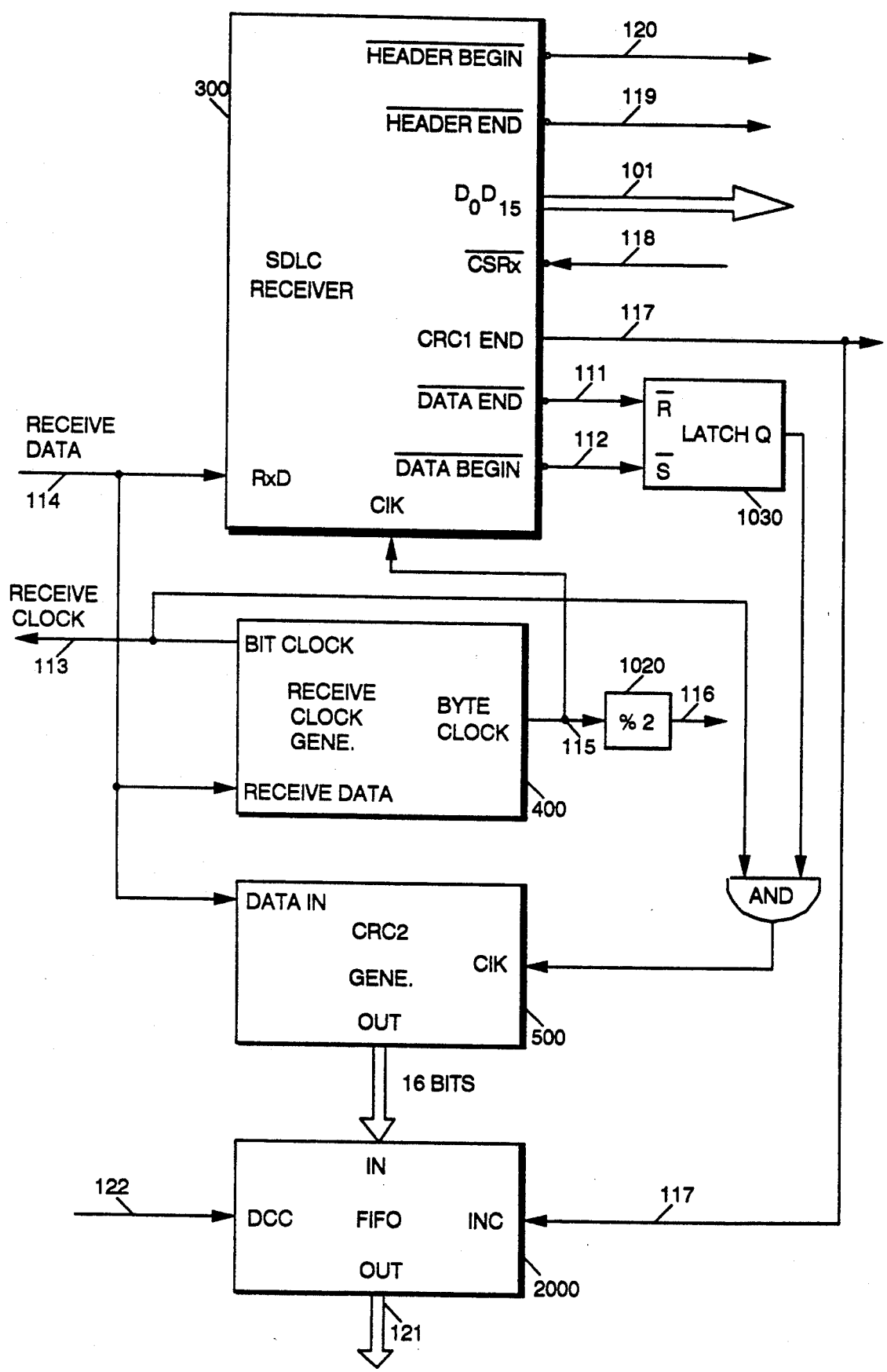
FIGS. 3, 4 and 5 are an illustration of a preferred embodiment of a store and forward mechanism according to the present invention.
Figure 4:
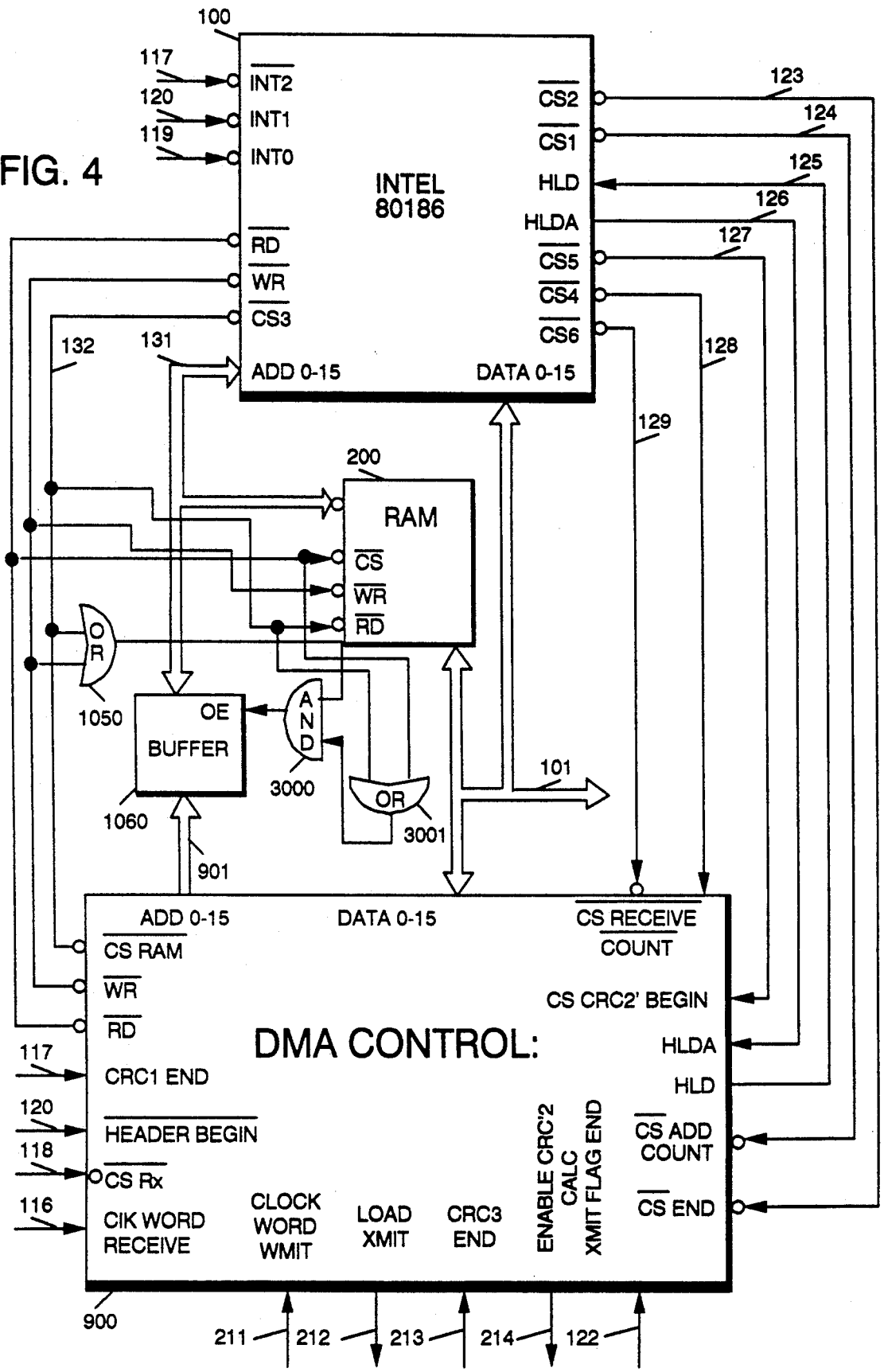
Figure 5:
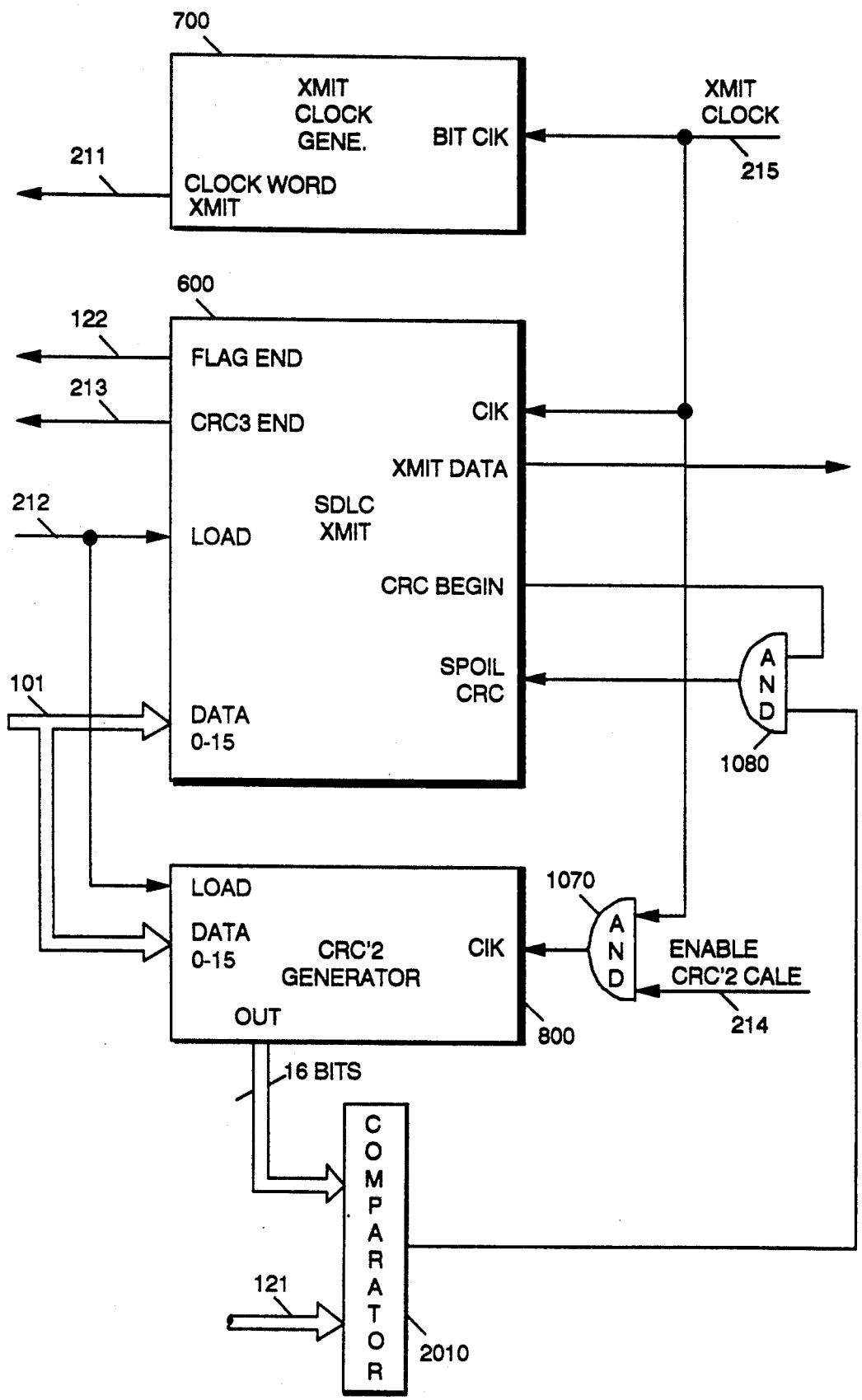

FIGS. 3, 4 and 5 illustrate a preferred embodiment of the store and forward mechanism according to the invention. With respect to FIG. 4, the mechanism comprises a microcontroller 100 such as the 16 bits INTEL 80186 which is connected to a RAM storage 200, being of the type 64 000×16 bits, by means of an address bus 131, a data bus 101 and traditional Chip Select (CS), write (WR) and read (RD) control leads. With respect to FIG. 3, controller 100 is also connected to a traditional SDLC receiver 300, the latter being associated with a RECEIVE CLOCK generator 400, and a CRC2 generator 500. Controller 100 is further connected to a SDLC transmitter 600 which is associated with a TRANSMIT CLOCK generator 700 and a CRC2' generator 800 which are illustrated in FIG. 5.

Controller 100 shares the different hardware resources with a DMA control circuit 900 as will be described hereinafter with more details. More particularly, SDLC RECEIVER 300 has DATA END output lead 111 which is connected to a reset input of a latch 1030, and a DATA BEGIN output lead 112 which is connected to the set input lead of the latter latch. The Q output lead of latch 1030 is connected to one input lead of an AND gate 1040 which has an output connected to the clock input of CRC2 generator 500, and a second input lead receiving the RECEIVE clock generated at the bit clock output lead 113 of RECEIVE CLOCK GENERATOR 400. Generator 400 also generates a byte clock on a lead 115 which is transmitted to the input of a divide-by-two circuit 1020.

Divide-by-two circuit 1020 has an output lead 116 which is connected to a CLOCK WORD RECEIVE input lead of DMA CONTROL circuit 900. Because of the division by two of the byte clock, the signal transmitted to the input 116 of DMA control circuit 900 is is phase with the bit clock generated on lead 113 but only consists in a clock pulse occurring on the appearance of a 16-bit word on 16-bit data bus 101. SDLC RECEIVE circuit 300 has respectively a HEADER END output lead 119 and a HEADER BEGIN output lead 120 which are connected to interrupt INT0 input lead and INT1 input lead of controller 100. HEADER BEGIN signal on lead 120 is also transmitted to the HEADER BEGIN input lead of DMA CONTROL circuit 900. SDLC RECEIVE circuit 300 shares with controller 100, with RAM storage 200, with a buffer 1000, with DMA CONTROL circuit 900, with SDLC XMIT circuit 600, and with CRC2' generator 800 the same 16-bit data bus 101. SDLC RECEIVE circuit 300 has an CS RX receive input which is connected to a corresponding CS RX output of DMA CONTROL circuit 900 by means of a lead 118, a CRC1 END output which is connected to a INC input of a FIFO 2000 and to a CRC1 input of DMA CONTROL circuit 900 by means of a lead 117, and a CLOCK input which receives the BYTE clock on lead 11S. RECEIVE CLOCK generator 400 generates the receive clock signal on lead 113 which is transmitted, for instance, to a Data Terminating Equipment and controls rythm of the reception of the incoming frame. CRC2 generator 500 generates, as described below, a 16-bit CRC2 pattern which is transmitted to a 16 bit input bus of FIFO 2000. The latter FIFO has an output 16-bit bus 121 which is connected to a first input bus of a comparator 2010 illustrated in FIG. 5, having a second input bus which is connected to a 16-bit output bus of CRC2' generator 800.

Controller 100 has a CS5 output lead 127, a HLDA output lead 126, a HOLD input lead 125, a CS1 output lead 124, a CS2 output lead 123, a CS6 output lead 129, a CS4 output lead 128 which are respectively connected to a CS CRC2' BEGIN input lead, a HLDA input lead, a HOLD output, a CS ADDRESS COUNTER input lead, a CS END input lead, a CS RECEIVE COUNT input lead, and ENABLE FORWARD input lead of DMA CONTROL circuit 900. Controller 100 has a RFAD control signal which is transmitted to a RD input lead of DMA CONTROL circuit 900 and to a first input of an OR gate 3001, or gate 3001 has a second input which receives the CS3 signal on lead 132, and has an output which is connected to a first input of an AND gate 3000. Controller 100 has a WR control signal which is transmitted to a first input of an OR gate 1050, and to a WR lead of DMA CONTROL 900. OR gate 1050 has a second input lead which is connected to CS3 output lead 132 of controller 100 and has an output lead which is connected to a second input of an AND gate 3000. AND gate 3000 has an output lead which is connected to the OUTPUT ENABLE input of a buffer 1060. The association of AND gate 3000 with OR gates 1050 and 3001 gives the capability of "enabling the output of the 3-state buffer 1060 in DMA mode" by means of the RD or WR control leads issued by DMA control circuit 900. Therefore, the latter becomes capable of addressing RAM 200 during read or write cycles. CS3 control signal on lead 132 is transmitted, in addition to CS input of RAM storage 200, to a CS RAM input of DMA CONTROL 900. Controller 100 has its 16-bit address bus 101 which is connected, in addition to RAM storage 200, to a 16-bit output bus of a buffer 1060, the input of which receiving the contents of the 16-bit output bus of DMA CONTROL circuit 900. The latter 16-bit output bus is also connected to a 16-bit input bus of buffer 1000. DMA CONTROL circuit 900 has a LOAD XMIT output lead 212 which is connected to a corresponding LOAD input lead of SDLC XMIT circuit 600 and also to the LOAD input of CRC2' generator 800. Further, DMA CONTROL circuit 900 has a ENB CRC2' CALC output lead 214 which is connected to a first input lead of an AND gate 1070, and a XMIT FLAG END input lead 122 which is connected to a FLAG END output lead of SDLC Xmit circuit 600 and also to a DECrement input lead of FIFO 2000. AND 1070 has a second input lead which receives the transmit clock on lead 215 which is generated at the bit clock output lead of XMIT CLOCK generator 700. The latter clock is also provided to the CLOCK input of SDLC XMIT circuit 600. XMIT CLOCK generator 700 has a CLOCK WORD XMIT output lead 211 which is connected to a corresponding CLOCK WORD XMIT input lead of DMA CONTROL circuit 900. The output lead of AND gate 1070 is connected to the CLOCK input of CRC2' generator 800. Comparator 2010 has an output lead which is transmitted to a first input lead of an AND gate 1080, a second input of which being connected to the CRC BEGIN output lead of SDLC XMIT circuit 600. AND gate 1080 provides at its output lead a SPOIL CRC signal to SDLC XMIT circuit 600 which will be used as a control signal for altering the CRC checksum which is computed into SDLC TRANSMIT circuit 600. XMIT CLOCK generator 700 and SDLC XMIT circuit 600 respectively provides a XMIT clock and a XMIT data which are transmitted to the next telecommunication node.

DMA CONTROL circuit 900 is particularly illustrated with respect to FIGS. 6 and 7 which, respectively, detail the receive and the transmit parts. With respect to FIG. 6, DMA CONTROL circuit 900 has a DMA RECEIVE COUNTER 920 which is connected to 16-bit data bus 101 and which has a 16-bit output bus 901 which is connected to a corresponding input bus of a tristate buffer 910. Buffer 910 has its output bus which is connected to bus 901 and is controlled by an OR gate 930, the output of which being connected to the OUTPUT ENABLE input lead of buffer 910. OR gate 930 has its two input leads which respectively receives RD control signal and CS RECEIVE COUNT control signal on lead 129 coming from controller 100. DMA RECEIVE COUNTER 920 has a Load (LD) input lead which is connected to the output of an OR 940 receiving WR control signal and CS RECEIVE COUNT signal on lead 129 at its two inputs. An AND gate 950 receives a ENABLE CLOCK WORD RECEIVE signal from an internal state machine 960 at ist first input lead. And gate 950 has its second input which receives CLOCK WORD signal on lead 116 and which is generated by divide-by-two circuit 1020. DMA RECEIVE COUNTER 920 has a POR reset input lead which receives the general power-on of the telecommunication equipment.

FIG. 7 illustrates the internal circuitry corresponding to the transmit part of DMA CONTROL circuit 900. A 16-bit DMA XMIT COUNTER 961 has an input bus which is connected to the 16-bit data bus 101, and a 16 bit output bus 911 which is connected to an input bus of a buffer 962, to a first input bus of a first comparator 963 and to a first input bus of a second comparator 964. Comparator 963 has a second input bus which is connected to the output bus of latching circuit 966 and a output lead which is connected to a set input of a latch 967. Latch 967 has its reset lead which receives the XMIT FLAG END signal on lead 122, and an output lead which provides the ENABLE CRC2' CALC signal on lead 214. Latching circuit 966 has its input bus which is connected to data bus 101 and has an ENABLE input lead which receives the CS CRC2' BEGIN signal on lead 127 which is generated by microcontroller 100. Comparing circuit 964 has its second input bus which is connected to the output of a latching circuit 965 and has an output lead which is connected to a STOP COUNT input lead of counter 961 and which is used for stopping the incrementation of the latter. Latching circuit 965 receives at its input the contents of data bus 101 and has a ENABLE input lead which receives the CS END signal on lead 123 generated by controller 100. Buffer 962 has an OUTPUT ENABLE lead which receives the output of an OR gate 968, the two input of which receiving the RD control signal and the CS ADDRESS COUNTER signal on lead 124 and generated by controller 100. Counter 961 has a CLOCK input lead which is connected to the output of an AND gate 969 having a first input lead receiving CLOCK WORD XMIT signal 211 which is generated by XMIT CLOCK generator 700. AND gate 969 has a second input lead which receives an ENABLE CLOCK WORD XMIT signal provided by an internal state machine 972 which will be described later on with respect to FIG. 11. Counter 961 has a LOAD input lead which receives the output of an OR gate 971 having its two input which respectively receives the write (WR) control signal and the CS ADDRESS COUNTER signal 124 which is generated by controller 100.

The invention operates as follows. At the power-on of the machine, an initialization process begins during which, particularly, the contents of DMA RECEIVE COUNTER 920 and DMA XMIT COUNTER 961 are reset. Then, during the actual data transmission process, frames are received by SDLC RECEIVER 300, for instance coming from a Data Terminating equipment. The incoming frames are well known SDLC frames consisting in the succession of the SDLC flag ('7E' in hexadecimal), followed by a header, the data to be transmitted, a 16-bit CRC checksum and, at last, a SDLC flag. The incoming frame is received at the RECEIVE DATA input lead 114 of SDLC RECEIVE circuit 300 which performs the traditional zero delete and deserialization of the frame. The words which result from the deserialization process are then stored into RAM storage 200 as follows. On the occurrence of the first bit of the header, SDLC RECEIVE circuit 300 activates HEADER BEGIN lead 120 which is transmitted to the INT1 input lead of microcontroller 100 and decoded by the latter as an interrupt control signal. In response to that interrupt, controller 100 activates RD control signal and CS6 control signal on lead 129, thus generating a low level at the output of OR 930. That low level is transmitted to OUTPUT ENABLE lead of tristate buffer 910. Buffer 910 transmits the actual contents of DMA RECEIVE COUNTER 920 to data bus 901, which is then transmitted to data bus 101 by means of buffer 1000, controlled by OR gate 1010 receiving the high levels of RD and CS6 control signals.

Controller 100 stores the contents of DMA RECEIVE COUNTER 920, which will be used later on as will be described hereinafter with details, into an appropriate location in RAM 200, for instance 'AAAA'. The HEADER BEGIN signal on lead 120 is also transmitted, in addition to controller 100 is a interrupt signal, to the corresponding HEADER BEGIN input of DMA CONTROL RECEIVE circuit 900.

Figure 8A:
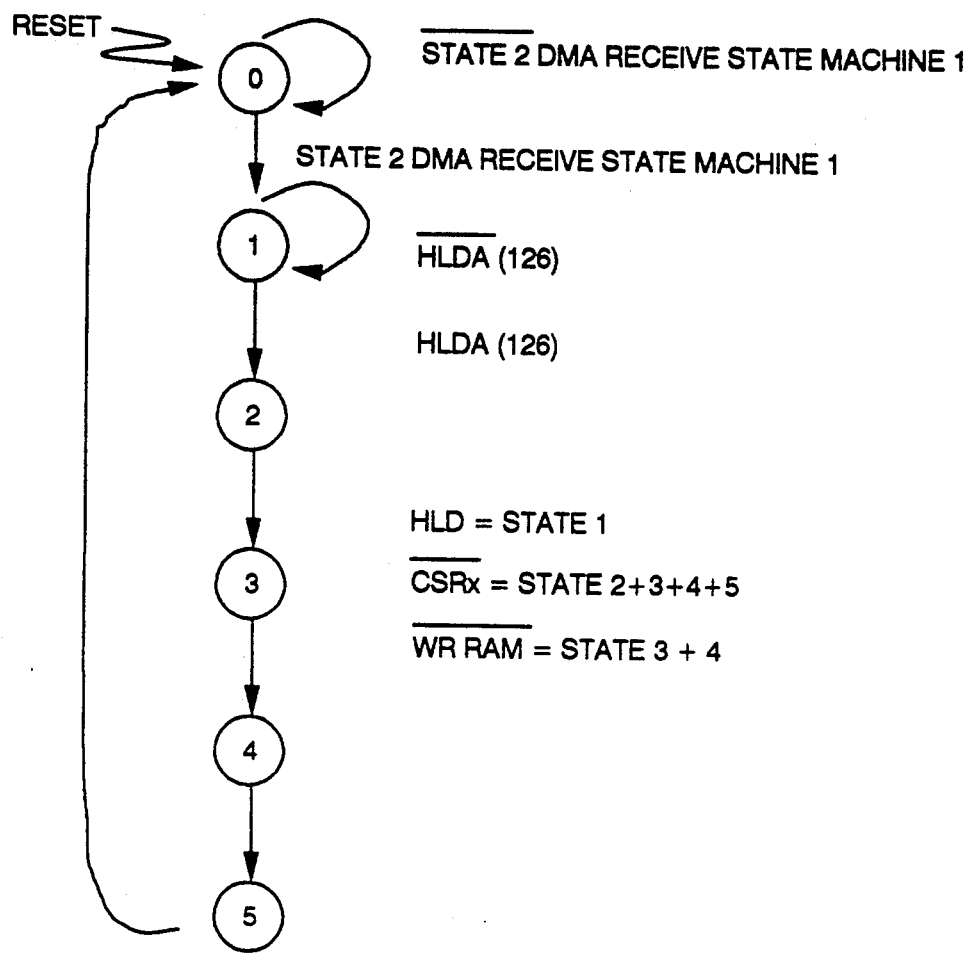
FIG. 8A and 9 illustrates the first and second internal DMA receive state machines which are included into circuit 900.
Figure 9:
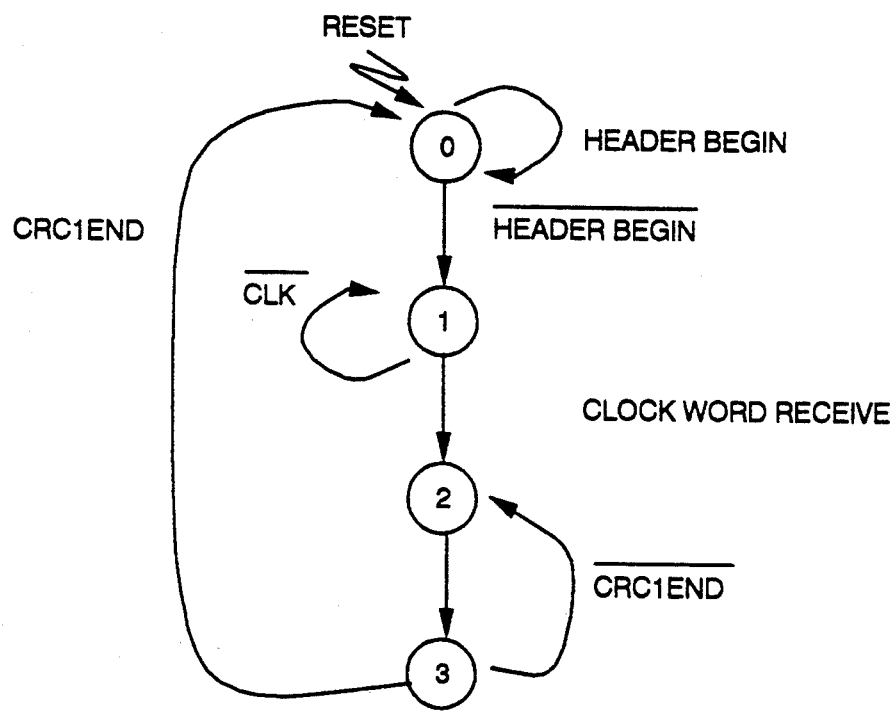

From this instant, circuit 900 waits for the occurrence of the CLOCK WORD RECEIVE signal on lead 116 which appears at the output of divide-by-two circuit 1020 receiving the byte clock signal. The generation of the latter is achieved by means of an analysis of the bit clock on lead 113 and the data included into the incoming frame on lead 114 as currently performed in the telecommunication field. On the occurrence of a CLOCK WORD RECEIVE pulse on lead 116, circuit 900 generates a set of HOLD on lead 125, CSRX on lead 118, and WR control signals allowing a direct loading of the received 16-bit word into RAM 200 in a Direct Memory access mode. To achieve this, circuit 900 generates a HOLD signal requesting the access of the bus 101. On the reception of the traditional HLDA signal on lead 126 generated by controller 100, circuit 900 generates a chip select CSRX control signal 118 for SDLC RECEIVER 300 in order to request the latter to provide the received word on data bus 101. Circuit 900 then generates a WR control signal which is transmitted to RAM 200, and the latter word is directly stored into it at the address which is specified by DMA RECEIVE COUNTER 920. Two distinctive states machines are used for achieving this logical processing which are illustrated in FIGS. 8A and 9. A first state machine (SM1) shown in FIG. 8A involves a set of 6 different states, numbered from 0 to 5, while a second state machine (SM2) involves 4 distinctive states referenced 0 up to 3. State 0 of SM1 is reached at the reset of the apparatus and is maintained as long as SM2 reaches its own state 2. Then, state machine SM1 reaches state I which is maintained until the reception of the HLDA signal from microcontroller 100. State machine I then successively proceeds from state 2, 3, 4, 5 and returns to state 0. The required HOLD, CSRX, and WR control signals are provided by means of a decoding of the different states of the SM1, as follows:

HOLD (lead 125)=state 1 inverted CSRX
(on lead 118)=2+3+4+5
inverted WR=3+4.

Figure 8B:
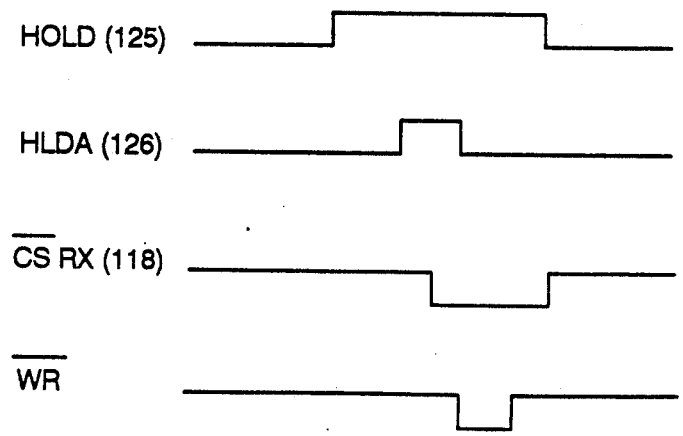
FIG. 8B shows typical timing diagrams of the bus access control signals.

Typical timing diagrams of the exchanged HOLD and HLDA control signals are drawn in FIG. 8B.

Similarly to above, the state 0 of the SM2 is reached after the reset of the machine and maintained until the HEADF-R BEGIN signal on lead 120 becomes low. The SM2 proceeds from state 1 to state 2 on the occurrence of the CLOCK WORD RECEIVE signal generated on lead 116 by divide-by-two circuit 1020. Then, the state machine directly proceeds to state 3. Then, it reaches again state 2 if the level of the CRC1 END signal on lead 117 is low. In the contrary case, the state machine SM2 proceeds to state 0 again. The decoding of the state 2 or state 3 provides an ENABLE CONTROL RECEIVE signal which is transmitted via OR gate 950 to the CLOCK input of DMA RECEIVE COUNTER 920, as shown in FIG. 3. An on-going incrementation process starts and the received words are sequentially stored into RAM 200 by DMA CONTROL circuit 900. As shown in FIG. 9 again, that storing process ends on the reception of a CRC1 END signal which is generated by SDLC RECEIVER 300 pursuant to the detection of the ending flag into the incoming frame.

Parallely to the above storing process in RAM 200, a second process is initiated which exactly starts with the beginning of the data field coinciding with the generation of a DATA BEGIN signal on lead 112 by SDLC RECEIVER 300. The latter signal is used as a control signal to set latch 1030, the output of which being transmitted to AND gate 1040. Consequently, the BIT clock existing on lead 113, which is generated by RECEIVE CLOCK GENERATOR 400 and which pulses the rate of the incoming frame, is transmitted to the CLOCK input lead of CRC2 generator 500. The latter initiates a CRC checksum calculation process starting with the first bit of the data field of the received frame. That second checksum calculation process, and also the first CRC1 calculation process which is performed in SDLC RECEIVER 300 on the entire incoming frame consisting of the header and the data, completes with the occurrence of the beginning of the ending flag.

If the CRC calculation process performed by SDLC RECEIVER 300 leads to a wrong value, a RETRY request is generated in order to ask the transmitter of the wrong frame to transmit the last frame again. Then, controller 100 reinitiates DMA RECEIVE COUNTER 920 to the value with was reached before the reception of the wrong incoming frame. This is straightforwardly achieved by means of the generation of CS RECEIVE COUNT 129 and WR control signals to the inputs of OR gate 940, entailing the loading of the address existing on data bus 101 into the counter. At the completion of the CRC1 calculation process, SDLC RECEIVER 300 generates a CRC1 END signal on lead 117 which is transmitted to the INC incrementation input of FIFO 2000. The 16-bit result of the second CRC2 calculation process which is performed by CRC2 generator 500 is then stored in FIFO 2000.

The CRC1 END signal on lead 117 is also used as an INT2 interrupt signal for controller 100, asking it to store the last value, for instance 'BBBB', reached by DMA RECEIVE COUNTER 920 into RAM 200, and also to initiate the new header calculation process, traditionally involved in store and forward mechanisms. At the completion of that calculation, the controller 100 supersedes the previous header with the new one by writing the latter into RAM 200, from the location 'AAAA'. The received frame is then ready to be forwarded to the next telecommunication node.

The transmission to the next node is performed as follows: Controller 100 respectively stores the beginning and ending addresses 'AAAA' and 'BBBB' into DMA XMIT counter 961 and latches 965. To achieve this, controller 100 extracts the beginning address value 'AAAA' from storage 200 and generates the latter on data bus 101. Then, controller 100 simultaneously generates a WR and a CS ADDRESS COUNTER control signal, on lead 124, which is transmitted to the LOAD input of DMA XMIT COUNTER 961 via OR gate 971. This causes the beginning address 'AAAA' to be loaded into the counter 961. Then, controller 100 extracts the ending value 'BBBB' of the frame to be transmitted and generates it on data bus 101. Controller 100 then generates a CS END control signal on lead 123 which is transmitted to latches 965 and causes the latter to store the ending address value. Controller 100 also stores the address corresponding to the beginning of the data field into latches 966 by means of a CE CRC2' BEGIN signal on lead 127, the latter address being used to initiate the CRC2' calculation process as described below.

Figure 10A:
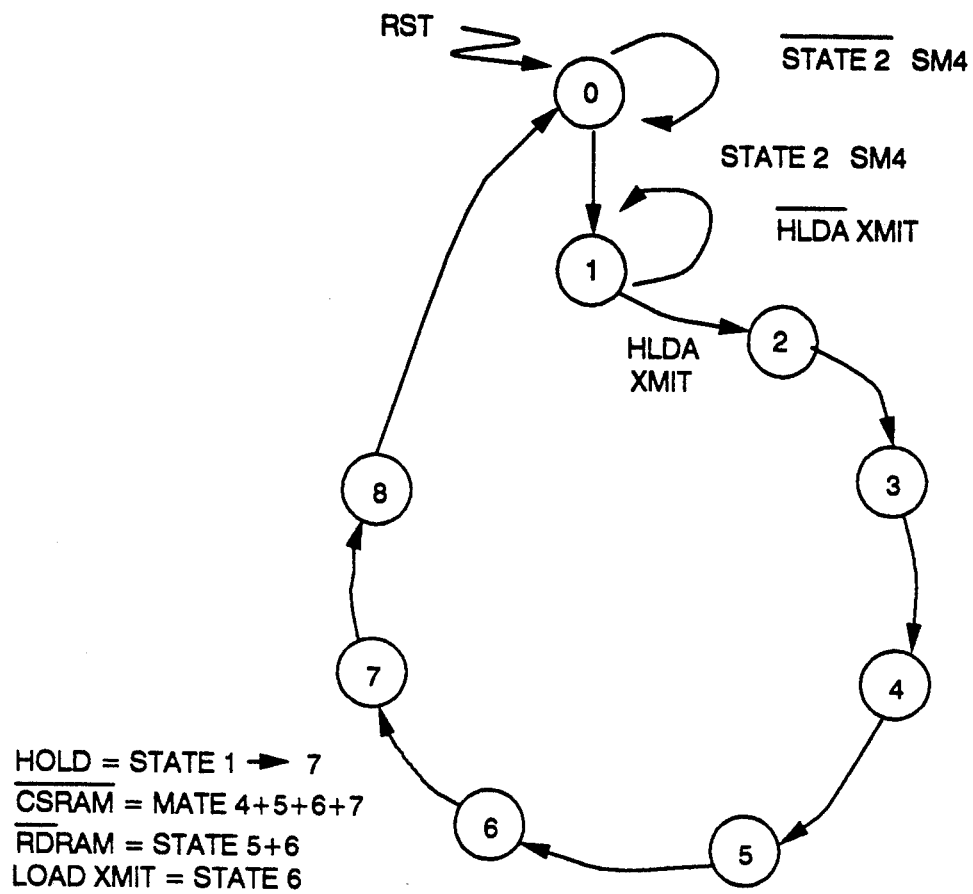
FIG. 10A and 11 illustrate the first and second internal DMA transmit state machines which are included into DMA control circuit 900.
Figure 11:
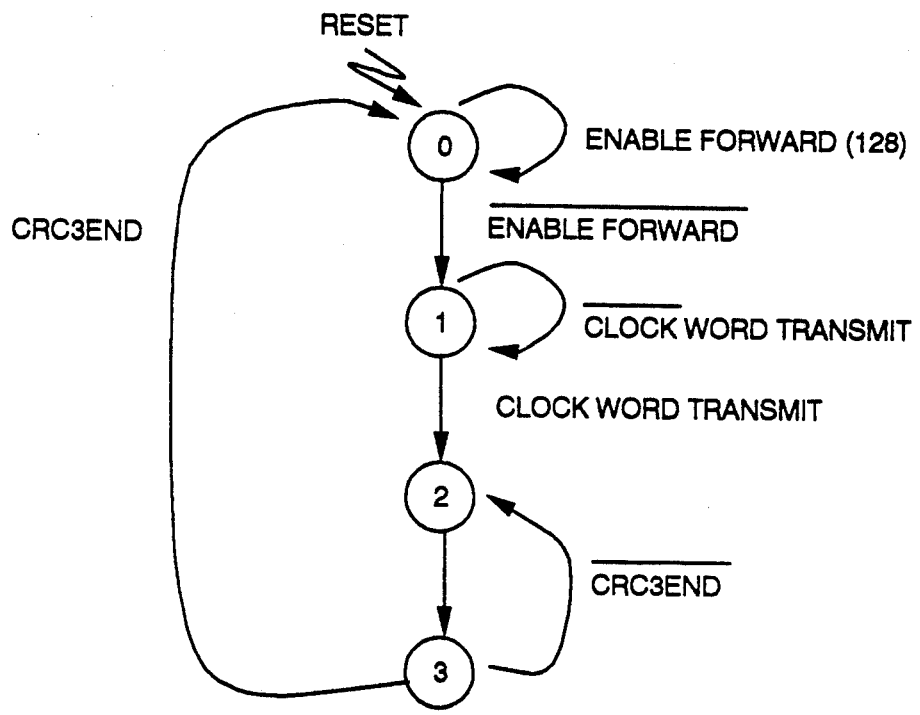

Similarly to what is described for the internal state machines SM1 and SM2, the forward process is based upon a set of two further internal state machines SM3 and SM4 which are illustrated in FIG. 10A and FIG. 11. With respect to FIG. 10A, State machine SM3 involves 9 different states, referenced 0 to 8, while SM4 involves only 4 as shown in FIG. 11. Both state machines SM3 and SM4 are reset to state 0 by means of a reset control signal.

The forward process phasis then continues with the generation of an ENABLE FORWARD control pulse on lead 128 by controller 100 which is transmitted to DMA CONTROL circuit 900, as shown in FIG. 4. That causes state machine SM4 to reach to state 1 where it waits for the occurrence of the CLOCK WORD XMIT pulse on lead 211 coming from XMIT CLOCK GENERATOR 700. On the occurrence of the latter, state machine SM4 proceeds to state 2, and then directly to state 3. On state 3, state machine SM4 reaches again state 2 if CRC3 END signal on lead 213 is at a low value. Conversely, state machine SM4 proceeds to state 0 again. The ENABLE CLOCK WORD TRANSMIT signal on lead 972 is provided by decoding the state 2 or 3 of the state machine SM4 according to the relationship:

ENABLE CLOCK WORD XMIT (lead 972) = state 2 + state 3

State machine SM3 proceeds from state 0 to state 1 on the occurrence of state 2 of state machine SM4. The state I of SM3 causes control circuit 900 to generate a hold signal on lead 125 requesting the access to the data bus 101. Then state machine SM3 waits for the reception of the HLDA signal on lead 126 indicating that microcontroller accepts to release the data bus. State machine SM3 then successively proceeds to state 2, 3, 4, 5, 6, 7, 8, and then again to state 0.

Similarly than above, the decoding of the different states of SM3 and SM4 provides the different control signals which are required in order to access the RAM storage.

The HOLD, CS, RD and LOAD signals are decoded according to the following relations:

HOLD (lead 125) = state 1 + 2 + 3 + 4 + 5 + 6 + 7
inverted CS (lead 132) = 4 + 5 + 6 + 7
inverted RD = 5 + 6
LOAD (lead 212) = 6

Figure 10B:
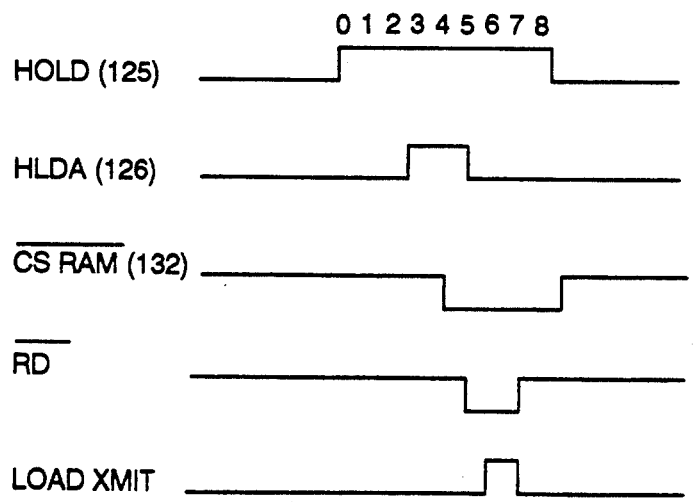
FIG. 10B shows typical timing diagrams of the bus access control signals.

The different control signals which are exchanged between DMA control circuit 900 and controller 100 are illustrated in FIG. 10B. Therefore, as soon as DMA control circuit 900 is authorized to access the data bus 101, the latter generates appropriate CSRAM and RD control signals. Circuit 900 therefore addresses RAM storage 200 via address bus 901 and buffer 1060 in order to successively read 16-bit groups which will be serialized by SDLC XMIT circuit 600.

When the contents of DMA XMIT counter 961 reaches the value 'BBBB' which was stored into latches 966 by controller 100 as described above, comparator 963 sets latch 967. The true 9 output of the latch provides the ENABLE CRC2' CALC control signal on lead 214 which is transmitted to the clock input of the CRC2' generator 800 via AND gate 1070. Latch 967 is reset on the occurrence of a XMIT FLAG END control signal on lead 122 which is generated by SDLC XMIT circuit 600. The generation of that XMIT FLAG END is traditionally achieved from the detection of the ending flag '7E'. Consequently CRC2' generator 800 performs, in addition to the third CRC checksum calculation which is performed into SDLC XMIT circuit 600, a fourth CRC checksum computing which starts on the first bit of the data field. It appears that, contrary to the checksum which is performed into SDLC XMIT circuit 600 and which starts on the first bit of the new header computed by controller 100, that fourth checksum calculation process begins on the first bit of the data field, as for CRC2 generator 500.

After the generation on data bus 101 of the last word of the data field of the frame to be transmitted, CRC2' generator 800 and SDLC XMIT circuit 600 complete their own checksum computing. The result of the fourth checksum computing performed by CRC2' generator 800 is then compared to the CRC2 result which was computed in the CRC2 generator 500 and which appears at the 16-bit output bus 121 of FIFO 2000. When the XMIT DATA lead of SDLC XMIT circuit 600 generates the first bit of its own checksum result, that is to say the result of the third CRC computing, circuit 600 also generates a CRC BEGIN signal which is transmitted to AND gate 1080. Thus, the result of the comparison performed by comparator 2010 is transmitted to the SPOIL CRC input lead of SDLC XMIT circuit 600 indicating the latter to introduce an error into the result of CRC3, for instance by inverting the last of the 16 bits of the checksum.

In another preferred embodiment of the invention, the latter spoil is achieved by means of a XOR gate having one input which is connected to the output of AND 1080 while its second input receives the transmitted SDLC data frame. The result of the comparison is thus used as a control signal which inverts one bit in either the header, or the data and the CRC field when the CRC2 does not match with the result of the CRC calculation process performed by CRC2' generator 800. The advantage of the second embodiment consists in the possibility of using a traditional widely marketed SDLC XMIT circuit. The two embodiments provides the same technical effect of introducing an alteration of the transmitted data frame which will permit the detection of the error which has been introduced during the storing process of the RAM.

It should be noticed that the improved store and forward mechanism according to the present invention does not require any processing resources from controller 100. Considering the high level of the traffic throughout the telecommunication nodes, this provides a substantial advantage. Further, the second checksum computing is performed by CRC2 generator 500 when the frame is still deserialized and similarly, the fourth checksum computing process is performed as the new frame (including the new header) is being serialized again. It appears that no supplementary delay is required with respect to the traditional store and forward mechanisms which do not assure the integrity of the data stored in the RAM. Therefore, the frames which are received in the node are stored during the the minimum time which is needed to achieved the computation of the new header field by controller 100. Thus, RAM storage capacity can also be reduced.

It should be noticed that the apparatus according to the present invention is able to achieve the transmission of one frame by SDLC XMIT circuit 600 while the reception of another frame by SDLC receiver 300 occurs. This is achieved by means of the FIFO 2000 which allows the storage of multiple CRC2 calculation results. The contention which may occur on the data bus 101 is managed by a specific mechanism which particularly gives the priority to the SDLC RECEIVER 300 so that none of the received data are lost.

In the preferred embodiment of the invention, the size of the FIFO 2000 is chosen so that a set of 256 16-bit words can be stored therein. This allows an efficient store and forward mechanism, even if very small SDLC frames are to be processed.

We claim:

1. Store and forward apparatus for a telecommunication node including
    means (300) for deserializing an HDLC frame of data which is received from a first telecommunication node under the form of a sequence of n-bits words, said frame including a header, a data field and a frame checking sequence (FCS) generated by said first node,
    a storage (200) for storing said deserialized n-bit words, through a Direct Memory Access means (900),
    processing means (100) addressing said storage for computing a new header for replacement of said header of said received HDLC frame in said storage, serializing means (600), fetching said n-bit words in said storage thru said DMA means, and forwarding them under the form of a new HDLC frame including a new FCS, to a second telecommunication node, said apparatus being characterized in that it includes:

means (500) in parallel with said deserializing means for computing a first partial FCS over said data field in said HDLC frame, means (200) for storing said first partial FCS, means (800) in parallel with said serializing means (600) for computing a second partial FCS covering said data field only, means (2010) for comparing said first and second partial FCS, means (600) responsive to said comparison for altering said new FCS whenever the two partial FCS are not equal before said serialization completes.

2. Store and forward apparatus according to claim 1 characterized in that said first partial FCS is stored into a FIFO storage having an output bus separate from the data bus which addresses said storage.

3. Store and forward apparatus according to claim 2 characterized in that said deserializing means (300) is an HDLC receiver which deserializes HDLC frames into n-bit words, said HDLC receiver generates a control signal for setting a latching circuit (1030) when the first bit of the data field of the incoming frame is received, and a second control signal for resetting said latching circuit when the last bit of the data field of said HDLC frame has been received, and said means for computing said first partial FCS is an FCS generator receiving the serial frame at its input and having a clock input which is controlled by the output of said latching circuit.

4. Store and forward apparatus according to claim 3 characterized in that said serializing means is an HDLC transmitter which has a control input for causing an alteration of the next bit which will appear at its output, said control input receiving the result of said comparison.

5. Store and forward apparatus according to claim 4 characterized in that said Direct Memory Access means comprises a first programmable counter (920) which can be loaded with a first predetermined address, and which is incremented as long as the last n-bit word including the last bit of the data field has not been deserialized, the output of said first counter being used to address said storage thereby providing the successive loading of the n-bit words therein, said DMA means further including means for storing the beginning address and the ending address reached by said first counter, said processing means computes a new header and stores it at the first locations determined by said beginning address, 6. Store and forward apparatus according to claim 5 characterized in that said Direct Memory Access means comprises a second programmable counter (961) whose output is used for addressing said storage and which is preloaded with the beginning address of the frame to be forwarded, and means for incrementing said second programmable counter;

first storage means (965) for storing the last address value corresponding to—said—frame to be forwarded, second storage means (966) for storing the address of the n-bit-word corresponding to the first bits of the data field, a first comparator (964) for comparing the contents of said second counter (961) with that of said first storage means (965), the output of said comparator being used as a control signal for stopping the incrementation of said second counter.

a second comparator (963) for comparing the contents of said second counter (961) with that of said second storage means (966) and having an output which is used to control the start of the computing of said second partial FCS.

7. Store and forward apparatus according to claim 6 characterized in that said means for computing a second partial FCS is an FCS generator having an input bus connected to the input of said HDLC transmitter, and having a clock input which receives a clock signal controlled by said second comparator (963).

8. Store and forward apparatus according to claims 1 to 7 characterized in the alteration is provided by means of an inversion of one bit of the new FCS.

9. Store and forward apparatus according to claims 1 to 7 characterized in that it comprises a XOR gate for introducing an alteration of the new FCS within the HDLC frame to be transmitted when said comparing means detects a mismatch of said second and fourth FCS result.

* * * * *